United States Patent [19]

Sutoh et al.

[11] 4,416,324

[45] Nov. 22, 1983

[54] VEHICLE TEMPERATURE CONTROL APPARATUS

[75] Inventors: Shinji Sutoh; Hara Toshizo; Hiroyuki Sugiura; Toshio Kojima, all of Konan, Japan

[73] Assignee: Diesel Kiki Company, Ltd., Tokyo, Japan

[21] Appl. No.: 250,973

[22] Filed: Apr. 3, 1981

[30] Foreign Application Priority Data

Apr. 10, 1980 [JP] Japan .................................. 55-47373

[51] Int. Cl.³ .............................................. F28F 27/00
[52] U.S. Cl. ........................................ 165/12; 165/16; 165/43; 236/13
[58] Field of Search ................. 62/243, 244, 229, 180; 165/12, 16, 42, 43; 98/2.01; 236/13

[56] References Cited

U.S. PATENT DOCUMENTS

| | | | |
|---|---|---|---|
| 2,714,808 | 8/1955 | Owen et al. | 62/243 |
| 3,428,115 | 2/1969 | Caldwell | 236/13 |
| 3,514,967 | 6/1970 | Vandermolen | 62/180 |
| 3,990,505 | 11/1976 | Davenport | 165/43 |
| 4,201,061 | 5/1980 | Heffernan | 62/98 |
| 4,289,195 | 9/1981 | Bellot et al. | 165/12 |
| 4,315,413 | 2/1982 | Baker | 62/180 |
| 4,325,426 | 4/1982 | Otsuka et al. | 165/12 |
| 4,340,113 | 7/1982 | Iwata et al. | 165/25 |
| 4,356,705 | 11/1982 | Sutoh et al. | 62/243 |
| 4,368,843 | 1/1983 | Kai et al. | 165/16 |
| 4,375,754 | 3/1983 | Okura | 62/180 |
| 4,381,480 | 4/1983 | Hara et al. | 237/5 |

Primary Examiner—William R. Cline
Assistant Examiner—John M. Kramer
Attorney, Agent, or Firm—Jordan and Hamburg

[57] ABSTRACT

An automotive air conditioning apparatus is provided which, in raising the temperature inside a vehicle cabin from a low level to a preset higher level in a maximum cooling mode or in lowering the cabin temperature from a high level to a preset lower level in a maximum heating mode, suitably controls in an initial stage of the procedure the revolution speed of a blower but does not drive an air mix door at all to keep it at an existing opening degree. When the revolution speed of the blower reaches a predetermined lowest speed, the air mix door begins to be driven to vary its opening degree progressively and suitably while, at the same time, a first reference temperature level for deactivating a compressor associated with a cooler is shifted to a second reference temperature level.

4 Claims, 9 Drawing Figures

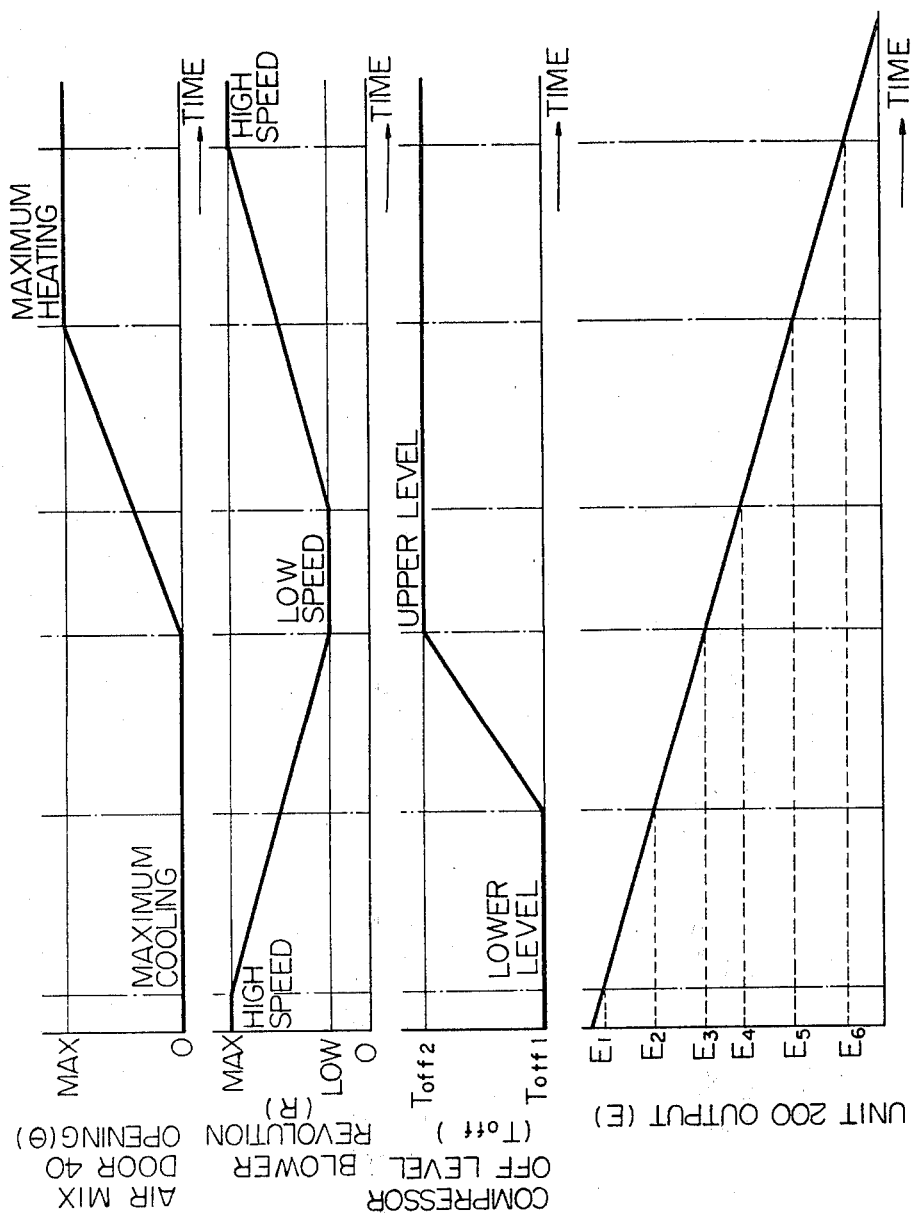

VEHICLE TEMPERATURE CONTROL APPARATUS

BACKGROUND OF THE INVENTION

The present invention relates to an air conditioning apparatus for an automobile vehicle or the like and, more particularly, to an apparatus for controlling the temperature in a cabin of the automobile vehicle.

A typical prior art vehicle air conditioning apparatus comprises a duct and a blower for forcing air through the duct. An evaporator of a cooler and a core of a heater are disposed in the duct and are selectively utilized. A movable temperature control door such as an air mix door controls air flow through the evaporator and core and thereby the temperature of air flowing through the duct. The air mix door is positioned in accordance with sensed air temperature.

In connection with such a known vehicle air conditioning apparatus, it is frequently demanded to raise a low cabin temperature set up by a maximum cooling mode of operation of the air conditioner up to a given level higher than said low temperature, that is, to lower the cooling ability during the maximum cooling mode. The air conditioner meets this demand by progressively reducing the operating speed of the blower from a maximum speed predetermined for the maximum cooling mode while, at the same time, progressively opening the air mix door from its zero opening or full closed position in the maximum cooling mode. The result is an increase in the cabin or inside temperature from the low level to a higher level. Also demanded frequently is to lower the cabin temperature from a high level set up by a maximum heating mode to a lower level, meaning to reduce the heating ability in the maximum heating mode. The air conditioner in this case gradually decelerates the operation of the blower from a maximum speed predetermined for the maximum heating mode and, at the same time, varies the angular position of the air mix door from its full open position to progressively reduce the opening degree thereof. Then the high cabin temperature in the maximum heating mode will drop to a lower level.

Where the cabin temperature in the maximum cooling mode or the maximum heating mode is to be switched to another preset level without changing the operation mode, both of the blower and the air mix door start their actions simultaneously so that air once cooled by the cooler is again heated by the heater. This brings about drawbacks that a compressor driving the cooler is overloaded and that the temperature of air blown into the vehicle cabin undergoes an unpleasant sharp change. Meanwhile, the compressor associated with the cooler is usually turned off at a predetermined temperature level which is the freezing level of the cooler and, accordingly, the compressor is not turned off unless the cooler is cooled to a significantly low temperature. The compressor is therefore operated at a very high rate which overloads a rotary drive source for the compressor, i.e. the engine of the vehicle.

Thus, prior art air conditioning apparatuses for motor vehicles involve some critical problems still left unsolved.

SUMMARY OF THE INVENTION

An air conditioning apparatus for a vehicle embodying the present invention includes an air flow duct communicating with a vehicle cabin, a blower for forcing air through the duct, a cooler for cooling air in the duct, a heater for heating air in the duct, a temperature control door disposed in the duct for controlling a proportion of air passing through the heater. The apparatus further includes an operation controller which correlatively or cooperatively controls the blower, cooler and temperature control door in such a manner that, when it is desired to raise a vehicle cabin temperature while operating in a maximum cooling mode, the operating speed of the blower is progressively decreased from an upper limit to a lower limit and maintained at the lower limit, the temperature control door is maintained at a position for preventing the heater from heating air passing through the cooler until the speed of the blower reaches the lower limit and starts to heat air passing through the cooler when the speed of the blower settles at the lower limit, and a cooler turn-off temperature level is maintained at a predetermined lower level until the speed of the blower reaches the lower limit and is changed to a predetermined upper level when the speed of the blower reaches the lower limit. The operation controller further correlatively or cooperatively controls the blower, cooler and temperature control door in such a manner that the speed of the blower is progressively increased from the lower limit to the upper limit when the cooler turn-off temperature level is maintained at the predetermined upper level and the temperature control door continues to heat air passing through the cooler.

In accordance with the present invention, in elevating the temperature of a cabin of an automotive vehicle from a low level in a maximum cooling mode to a preset higher level or lowering the cabin temperature from a high level in a maximum heating mode to a preset lower level, the air conditioning apparatus in an initial stage of the operation controls only the rotating speed of the blower suitably to adjust the amount of air forced thereby while keeping the air mix door at its existing position or opening degree. At the instant the blower speed reaches a predetermined minimum speed, the air conditioner starts driving the air mix door to progressively and suitably vary the opening degree thereof and, at the same time, alters to a preselected second level the temperature level at which the compressor for the cooler is to be turned off.

It is an object of the present invention to provide an improved air conditioning apparatus which operates in a more efficient manner than comparable apparatus known heretofore.

It is another object of the present invention to provide an air conditioning apparatus in which a loss attributable to heating of air at the heater which has been cooled by the cooler is eliminated.

It is another object of the present invention to provide an air conditioning apparatus in which the temperature of air blown into the vehicle cabin is prevented from being sharply changed.

It is another object of the present invention to provide an air conditioning apparatus which reduces the time which a compressor is maintained in operation.

It is another object of the present invention to provide a generally improved air conditioning apparatus.

Other objects, together with the foregoing, are attained in the embodiments described in the following description and illustrated in the accompanying drawings.

BRIEF DESCRIPTION OF THE DRAWINGS

FIGS. 4a–4d show graphs illustrating the operation of the air conditioning apparatus of the present invention of FIG. 3.

DESCRIPTION OF THE PREFERRED EMBODIMENTS

While the air conditioning apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
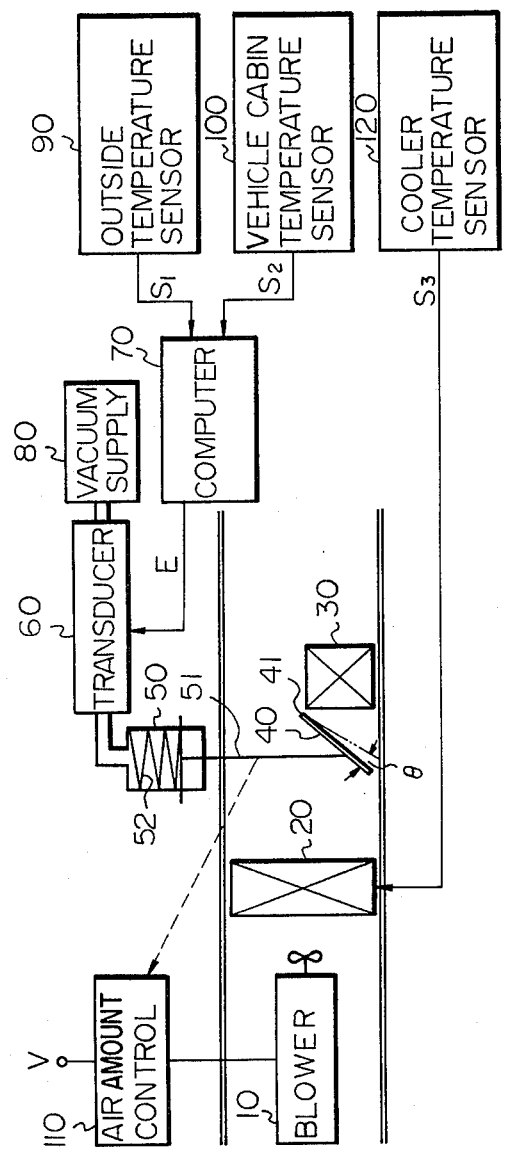
FIG. 1 is a schematic diagram of a prior art air conditioning apparatus.

To facilitate understanding of the present invention, a brief reference will be made to a prior art automotive air conditioning apparatus illustrated in FIG. 1. The air conditioning apparatus includes a blower 10 for introducing outside air and recirculated air selectively into the ductwork of the apparatus and a cooler 20 which comprises an evaporator to cool air forced thereto from the blower 10. A heater 30 in the form of a heater core is positioned in the ductwork downstream of the cooler 20. Disposed in front of the heater 30 is a temperature control door or air mix door 40 adapted to suitably proportion cool and hot air which is to be mixed together.

Figure 2A:
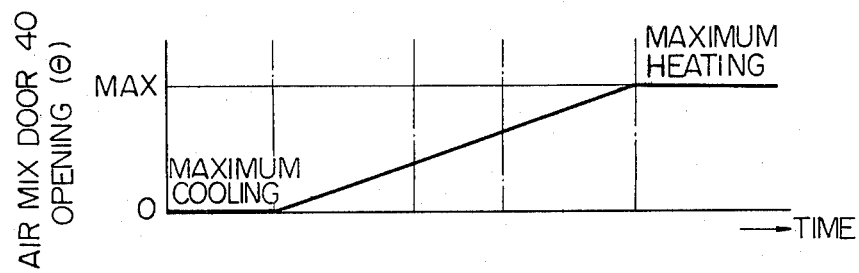
FIGS. 2a–2c show graphs illustrating the operation of the prior art air conditioning apparatus of FIG. 1.
Figure 2B:
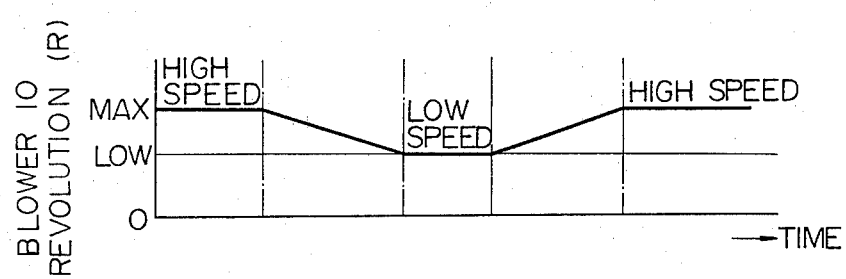
Figure 2C:
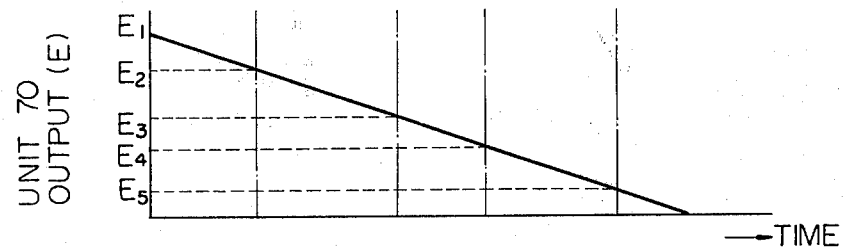

The air mix door 40 is pivotable about a shaft 41 and connected with one end of a rod 51 which extends from an actuator 50. The rod 51 is reciprocative to move the air mix door 40 about the shaft 41 and thereby suitably adjust the position or opening degree $\theta$ of the air mix door 40. The actuator 50 is controlled by a transducer 60 which serves to suitably adjust vacuum supplied thereto from a source of vacuum supply 80 in accordance with the level of an output signal E of a computing unit 70. The controlled vacuum is supplied to the actuator 50 to adjust the amount of displacement of the rod 51. The computing unit 70 receives a signal $S_1$ indicative of a temperature outside the cabin from an outside temperature sensor 90 and a signal $S_2$ indicative of a temperature inside the cabin from an inside temperature sensor 100 and determines a difference between the two temperatures. Based on this temperature difference, the computing unit 70 supplies the transducer 60 with a signal E for controlling the opening degree $\theta$ of the air mix door 40 and the revolution speed R of the blower 10 in a manner demonstrated in FIGS. 2a–2c. The blower 10 is fed with a source voltage V through an air amount control circuit 110. Operatively connected with the actuator rod 51, the air amount control circuit 110 varies its resistance in response to a movement of the actuator rod 51 and thereby suitably control the voltage V applied from a source to the blower 10.

Where the temperature outside the vehicle cabin is relatively high as in summertime, the air conditioner in an initial stage of its operation maintains the opening degree $\theta$ of the air mix door 40 zero, that is, keeps the door 40 fully closed (maximum cooling mode) as shown in FIG. 2a while causing the blower 10 to operate at a revolution speed R which is the highest (HIGH SPEED) as shown in FIG. 2b. As the temperature inside the vehicle cabin is lowered to a predetermined reference level, the air mix door 40 is moved to progressively increase its opening degree $\theta$ from the zero opening degree whereby the speed R of the blower is progressively decreased through the aforementioned linkage between the actuator rod 51 and the air amount controller 110. When the air mix door 40 reaches a substantially intermediate opening degree $\theta$, the revolution speed R of the blower 10 is lowered (LOW SPEED). More specifically, when the outside air temperature is relatively high as in summertime, the air mix door 40 is initially controlled to obtain a zero opening degree $\theta$ by an output signal $E_1$ of the computing unit 70 as indicated in FIG. 2c. This accompanies a high speed operation of the blower 10. As the inside temperature drops to a predetermined level, a signal $E_2$ is coupled from the computing unit 70 to the transducer 60 to elevate the inside temperature beyond the level in the maximum cooling mode whereby the opening degree $\theta$ of the air mix door 40 is gradually increased and so is done the revolution speed R of the blower 10.

However, when the signal $E_2$ for elevating the inside temperature beyond the level in the maximum cooling mode is fed from the computing unit 70, the air mix door 40 is immediately caused to move from the zero opening position allowing air once cooled by the cooler 20 to be heated again by the heater 30. This overloads a compressor for driving the cooler 20 and, therefore, the engine of the vehicle. Additionally, the temperature of air introduced into the vehicle cabin undergoes a sharp change.

In the prior art apparatus, the compressor adapted to drive the cooler 20 is controlled by an output signal $S_3$ of a sensor 120 responsive to the temperature of the cooler 20. This compressor control is such that the compressor is turned off when the output signal $S_3$ of the sensor 120 reaches a predetermined level, thereby preventing the compressor from being freezed. With this method, however, the compressor remains operative until the cooler 20 is cooled to a very low temperature. The operating rate of the compressor is therefore increased with the engine thus overloaded.

The present invention precludes the drawbacks described hereinabove with principles which may be summarized as follows. If the occupant desires to raise the temperature inside the vehicle cabin from the low level in the maximum cooling mode to the preset higher level, that is, in reducing the cooling ability of the air conditioning apparatus, the present invention first decelerates only the operation of the blower to adjust the amount of air supply and thereby reduce the cooling ability without changing the existing position or opening degree of the air mix door at all. Subsequently, the cooling ability is further reduced by shifting the compressor turn-off temperature level to a second or higher predetermined reference level and further decelerating the blower operation. It is not until this moment that the air mix door is driven progressively from the zero opening position toward the heating mode side. Stated another way, a decrease in the cooling ability from the one in the maximum cooling mode is provided by controlling only the amount of air forced by the blower with the air mix door fixed in the maximum cooling position. This avoids excessive loads on the cooler driving compressor and, therefore, the engine and frees vehicle occupants from unpleasant sensation which would otherwise result from the sharp change in the temperature of air forced into the vehicle cabin. Likewise, in lowering the inside temperature in the maxiumum heating mode from the higher level to the preset low level, that is, in reducing the heating ability of the air conditioning apparatus, an initial stage of operation according to the invention consists in controlling only the amount of air fed by the blower while maintaining the air mix door in the maximum heating position.

Figure 3:
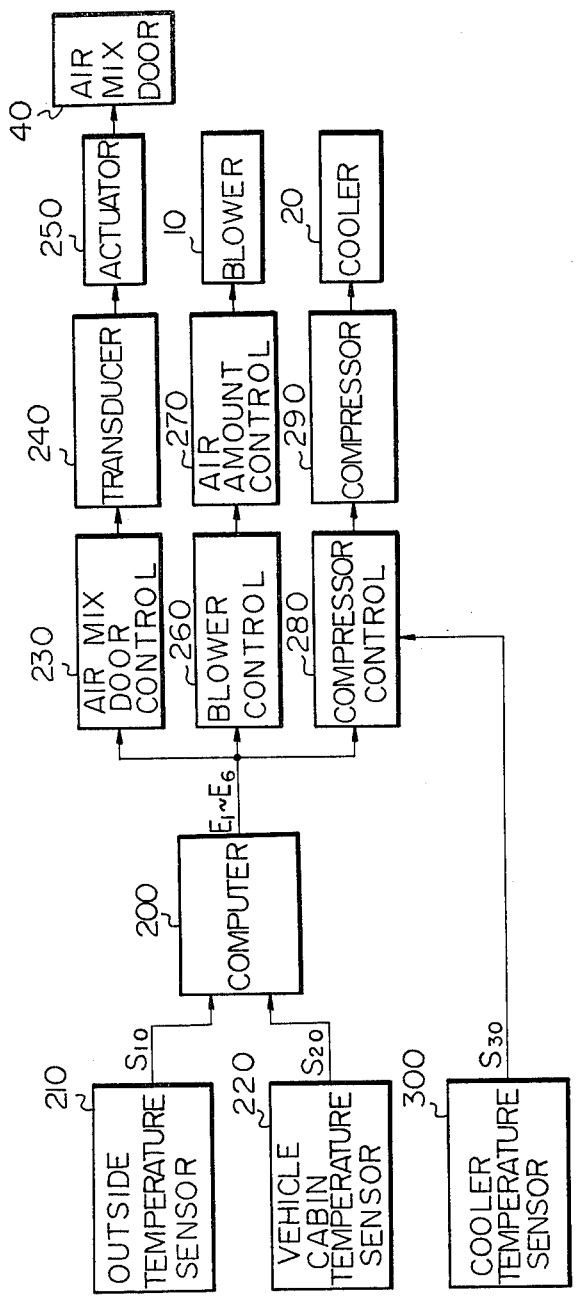
FIG. 3 is a schematic diagram of an air conditioning apparatus embodying the present invention.

A preferred embodiment of a control system associated with the air conditioning apparatus according to the present invention is shown in a block diagram in FIG. 3. A computing unit 200 is supplied with an output signal $S_{10}$ of a first sensor 210 responsive to a temperature outside a cabin of an automotive vehicle and an output signal $S_{20}$ of a second sensor 220 responsive to a temperature inside the vehicle cabin. Comparing these input signals $S_{10}$ and $S_{20}$, the computing unit 200 determines a difference therebetween and produces signals $E_1$–$E_6$ as indicated in FIG. 4d which are coupled to an air mix door control unit 230. In response to each of the signals $E_1$–$E_6$ of different levels, the air mix door control unit 230 operates a transducer 240 which in turn controls an actuator 250 for controlling the position of an air mix door 40. The signal outputs $E_1$–$E_6$ of the computing unit 200 are also applied to a blower control unit 260 which then controls an air amount control unit 270 in accordance with the signals $E_1$–$E_6$ to control the amount of air supply from a blower 10. Further, the signal outputs $E_1$–$E_6$ are coupled to a compressor control unit 280 adapted to control the operation of a compressor 290 electrically connected with a cooler 20.

As shown in FIGS. 4a and 4d, the air mix door control unit 230 actuates the air mix door such that the opening degree $\theta$ of the air mix door 40 progressively increases when the input signal from the computer 200 is $E_3$ and reaches the maximum when the input signal is $E_5$. The blower control unit 260 as shown in FIGS. 4b and 4d lowers the revolution speed R of the blower 10 in response to an input signal $E_1$, reduces the blower speed R to the minimum in response to input signals $E_3$ and $E_4$, increases the blower speed R in response to input signals $E_4$ and $E_5$; and makes the blower speed R maximum in response to an input signal $E_6$. The compressor control unit 280 as shown in FIGS. 4c and 4d actuates the compressor 290 such that the compressor 290 is deactivated when the temperature at the cooler 20 drops to a predetermined level or compressor turn-off level $T_{off}$ which is detected by a cooler temperature sensor 300 connected with the compressor control unit 280. In the illustrated embodiment, the compressor turn-off level $T_{off}$ has a lower limit $T_{off1}$ which is the freezing point of the evaporator of, for example, 2° C. and an upper limit $T_{off2}$. When the compressor control unit 280 is supplied with signals $E_2$ and $E_3$, the temperature $T_{off}$ at the cooler 20 rises progressively from the lower limit to the upper limit; the cooler temperature $T_{off}$ reaches the upper limit $T_{off2}$ when signals $E_3$–$E_6$ are fed to the compressor control unit 280. In this way, the compressor 290 is driven until the temperature at the cooler 20 drops to a sufficiently low level as long as the level of the computer output E is comparatively low. As the level of the signal E grows comparatively high, the compressor 290 is deactivated before the sufficient drop of the temperature at the cooler 20 and the turn-off rate of the compressor is increased.

In operation, where the temperature outside the vehicle cabin is relatively high as in summertime, the air mix door control 230 in an initial stage keeps the opening degree $\theta$ of the air mix door 40 zero establishing a maximum cooling mode. In this mode, the blower 10 is driven at a high speed. Upon a fall of the temperature inside the vehicle cabin, the difference between the outside temperature signal $S_{10}$ and inside temperature signal $S_{20}$ compared by the computer 200 is varied. Then the air mix door control 230 is supplied with a computer output $E_1$ (a signal commanding a fall of the cooling ability to keep the inside temperature constant). The air amount control 270 is activated to reduce the revolution speed R of the blower 10 whereby the cooling ability of the air conditioner is lowered. At this stage of operation, the air mix door 40 is maintained at the full closed position to avoid a loss resulting from heating of air cooled by the cooler 20 again by the heater 30 and thereby free the compressor for the cooler 20 from overloads. Also, there is prevented a sudden rush of hot air into the vehicle cabin which would invite an abrupt change in the inside temperature. When a second level of signal $E_2$ is coupled from the computer 200 to the compressor control 280, the compressor turn-off level $T_{off}$ increases progressively from the lower limit $T_{off1}$ to elevate the temperature level at which the compressor 290 will be deactivated.

If the cabin temperature still remains low even after the procedure for reducing the cooling ability stated above, the computer 200 delivers a third level of signal $E_3$ to the air mix door control 230. Then the actuator 250 is activated to permit the air mix door 40 to start its opening movement whereby a limited part of the air cooled by the cooler 20 is heated by the heater 30 to lower the cooling ability of the air conditioner. At this instant, the blower 10 has its revolution speed R reduced to the minimum while the compressor 290 has its turn-off level $T_{off}$ brought to the upper limit $T_{off2}$ and thus operates at a low activation rate. As a result, wasteful heating of once cooled air can be avoided and the load on the compressor associated with the cooler 20 is cut down to in turn alleviate the load on the engine.

When a fourth level of signal $E_4$ appears from the computer 200, the operation of the blower 10 begins to be accelerated. As the signal $E_4$ is replaced by a fifth level of signal $E_5$, the air mix door 40 reaches the full open position allowing almost all of the air from the blower 10 to be heated by the heater 30. In response to a sixth level of signal $E_6$, the revolution speed R of the blower is increased to the maximum MAX to set up a maximum heating mode.

Where the outside temperature is relatively low as in wintertime, an output signal $E_6$ of the computer 200 causes the air mix door 40 to be in the full open position (100% opening degree) which establishes a maximum heating mode, and drives the blower 10 at a high speed. As the inside temperature rises, signals $E_6$ and $E_5$ appear from the computer 200 so that the air amount control 270 is activated to lower the revolution speed R of the blower 10. The air mix door 40 at this stage still remains in the full open position. In other words, the air conditioner does not reduce the heating ability while reducing the opening degree $\theta$ of the air mix door 40 at the same time. For this reason, the revolution speed R of the blower 10 is quickly decreased.

When the computer 200 delivers output signals $E_5$ and $E_4$, the air mix door 40 and blower 10 are so controlled as to decrease the cooling ability of the air conditioner. At this instant, however, a sharp change in the cooling ability is prevented because the air mix door 40 is opened only after a decrease in the amount of air forced by the blower 10.

In summary, in an air conditioning apparatus of the type having at least a blower, a cooler, a compressor associated with the cooler and an air mix door adapted to suitably proportion cool and hot air to be mixed together, it will be seen that the present invention starts moving the air mix door from its position where the proportion of cool air is the maximum in a direction to increase the proportion of hot air, only after reducing the amount of cool air from the cooler by decelerating the revolution of the blower and raising the reference temperature level for deactivation of the compressor. This avoids the wasteful operation of heating air once cooled by the cooler again at the heater. Due to the decrease in the operation rate of the compressor, the load on the compressor and, therefore, on the engine can be decreased. The change in the temperature of air blown into a vehicle cabin becomes slow; for instance, a sudden rush of hot air in place of cool air supplied in a maximum cooling mode is prevented.

Various modifications will become possible for those skilled in the art after receiving the teachings of the present disclosure without departing from the scope thereof.

What is claimed is:

1. An air conditioning apparatus for a vehicle comprising:
   an air flow duct communicating with a vehicle cabin;
   a blower for forcing air through the duct;
   a cooler for cooling air in the duct;
   a heater for heating air in the duct;
   a temperature control door disposed in the duct for controlling a proportion of air passing through the heater; and
   operation control means for correlatively or cooperatively controlling the blower, cooler and temperature control door, said operational control means being constructed in such a manner that, when it is desired to raise the vehicle cabin temperature while operating in a maximum cooling mode, the operating speed of the blower is progressively decreased from an upper limit to a lower limit and maintained at the lower limit, the temperature control door is maintained at a position for preventing the heater from heating air passing through the cooler until the speed of the blower reaches the lower limit and starts to heat air passing through the cooler when the speed of the blower settles at the lower limit, and the cooler turn-off temperature level is maintained at a predetermined lower level until the speed of the blower reaches the lower limit and changed to a predetermined upper level when the speed of the blower reaches the lower limit;
   said operation control means being constructed to further correlatively or cooperatively control the blower, cooler and temperature control door in such a manner that the speed of the blower is progressively increased from the lower limit to the upper limit when the cooler turn-off temperature level is maintained at the predetermined upper level and the temperature control door continues to heat air passing through the cooler.

2. An air conditioning apparatus as claimed in claim 1, in which the operation control means is further constructed to control the blower, cooler and temperature control door in such a manner that, when it is desired to lower the vehicle cabin temperature while operating in a maximum heating mode, the speed of the blower is progressively decreased from the upper limit to the lower limit and maintained at the lower limit, and the temperature control door is maintained at a position for heating all air passing through the cooler and prevents the heater from heating air passing through the cooler when the speed of the blower reaches the lower limit speed.

3. An air conditioning apparatus as claimed in claim 2, in which the operation control means is further constructed to control the cooler in such a manner that a cooler turn-off temperature level is maintained at a predetermined upper level until the speed of the blower reaches the lower limit.

4. An air conditioning apparatus as claimed in claim 1, in which the operation control means comprises outside temperature sensor means for sensing the outside temperature, vehicle cabin temperature sensor means for sensing the vehicle cabin temperature, computing unit for computing the difference between the outside temperature and the vehicle cabin temperature in accordance with the sensed outside temperature and vehicle cabin temperature and producing an output control signal, temperature control door control unit for controlling the opening of the temperature control door in response to the output control signal from the computing unit, blower control unit for controlling the rotation of the blower in response to the output signal from the computing unit, cooler temperature sensor means for sensing a cooler temperature, and cooler control unit for controlling the cooler operation off temperature level in accordance with the sensed cooler temperature.

* * * * *